May 28, 1963 V. P. HEAD 3,091,117
MEANS FOR EFFECTING INSTRUMENT PHASE ADJUSTMENT
Filed Oct. 21, 1958 3 Sheets-Sheet 1

FIG. I.

INVENTOR.
VICTOR P. HEAD
BY
ATTORNEYS

May 28, 1963 V. P. HEAD 3,091,117
MEANS FOR EFFECTING INSTRUMENT PHASE ADJUSTMENT
Filed Oct. 21, 1958 3 Sheets-Sheet 2

INVENTOR.
VICTOR P. HEAD
BY
ATTORNEYS

May 28, 1963  V. P. HEAD  3,091,117
MEANS FOR EFFECTING INSTRUMENT PHASE ADJUSTMENT
Filed Oct. 21, 1958  3 Sheets-Sheet 3

INVENTOR.
VICTOR P. HEAD
BY
ATTORNEYS

United States Patent Office 3,091,117
Patented May 28, 1963

3,091,117
MEANS FOR EFFECTING INSTRUMENT PHASE ADJUSTMENT
Victor P. Head, Hatboro, Pa., assignor to Fischer & Porter Company, Hatboro, Pa., a corporation of Pennsylvania
Filed Oct. 21, 1958, Ser. No. 768,701
4 Claims. (Cl. 73—194)

This invention relates to means for effecting instrument phase adjustments for the suppression of noise signals in quadrature with desired signals to be transmitted and measured.

The problem of quadrature signals commonly arises in connection with circuits having low input levels particularly when the desired signals are at the frequency of commercial supply lines used for energization of the apparatus. Quadrature noises are difficult to eliminate except by careful phase adjustments. Typical of the type of apparatus involving quadrature signal problems are magnetic flowmeters in which the potential induced in a liquid flowing through a magnetic field is utilized as a measure of quantity of flow and is quite small particularly when low rates of flow are undergoing measurement. Settings for the suppression of quadrature signals have generally involved the use of oscilloscopes. In accordance with the present invention, the use of oscilloscopes is avoided and indication of suppression of quadrature signals is obtained by reference to a meter operating in conjunction with means for inserting artificial quadrature signals into the apparatus undergoing adjustment.

The general objects of the present invention relate to the foregoing. The invention is of general applicability, but for complete illustration thereof it will be described in its application to a magnetic flowmeter. The type of magnetic flowmeter herein described provides for high accuracy of measurement at low rates of linear flow of liquids of low conductivity, a high degree of insensitivity to lead lengths, quick responses to changes in flow rate, and other advantageous features.

Various aspects of the following disclosure are claimed in other applications filed of even date herewith. The general electrical circuitry involved is the invention of Sholom Kass and is claimed in his application, Serial No. 768,595. Improved means for providing a uniform magnetic field are claimed in my application, Serial No. 768,596, now Patent No. 3,005,342. Means for effecting minimizing or damping of response pulsations is the invention of Sholom Kass and is claimed in his application, Serial No. 768,762.

The present application is directed to the matters described above relating to the suppression of quadrature noise signals.

The attainment of the foregoing results and of other objectives relating to details will become apparent from the following description, read in conjunction with the accompanying drawings, in which.

Figure 1:
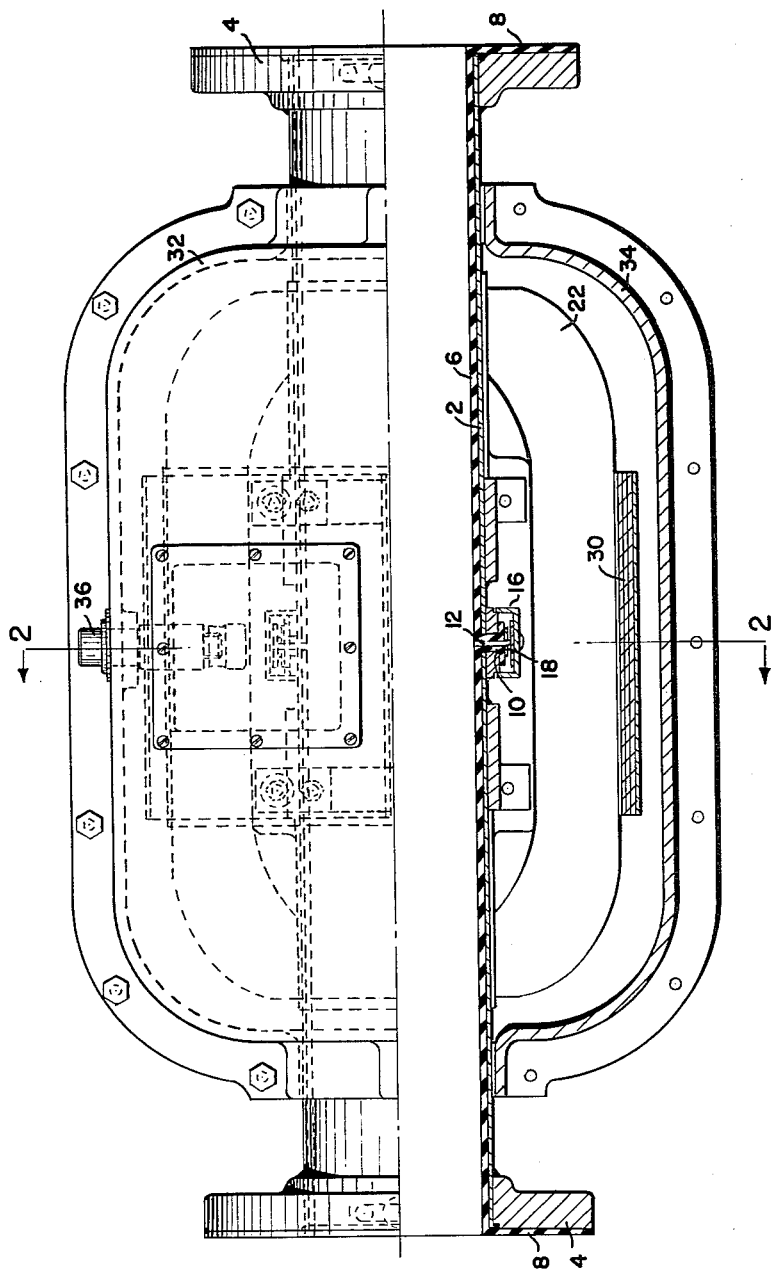
FIGURE 1 is a plan view of the primary unit of a flowmeter embodying the foregoing inventions, the lower half of this figure showing an axial section.
Figure 2:
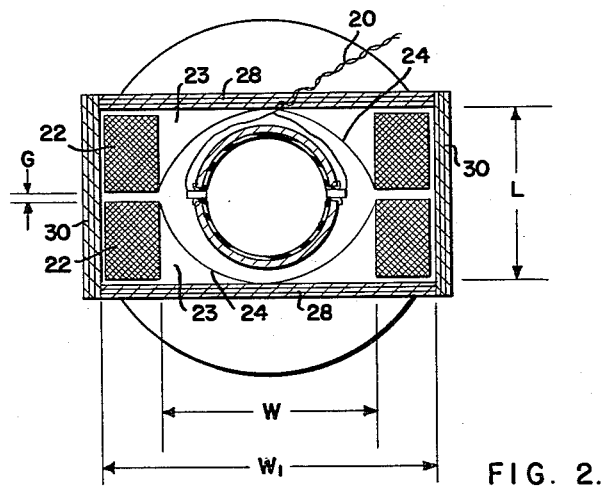
FIGURE 2 is a diagrammatic transverse section taken on the plane indicated at 2—2 in FIGURE 1.
Figure 3:
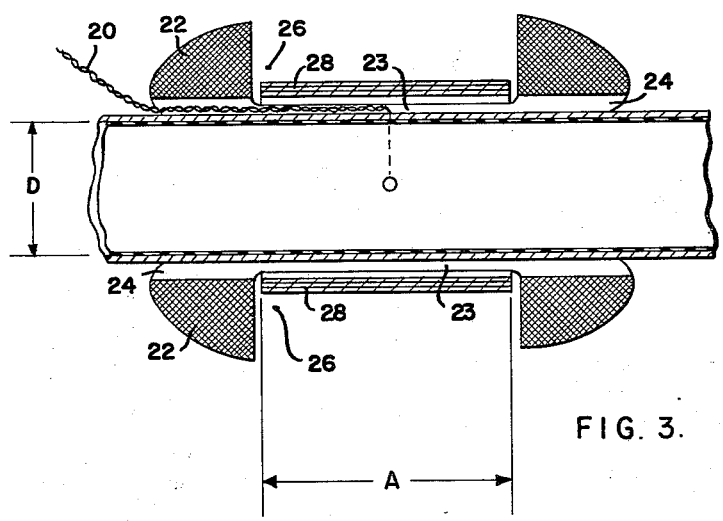
FIGURE 3 is a diagrammatic longitudinal section taken along an axial plane at right angles to that involved in FIGURE 1.

Referring first to FIGURES 1, 2 and 3, the meter which is disclosed herein and which embodies the present invention comprises a stainless steel tube 2 provided with end flanges 4 by means of which external connections may be made to direct through the tube 2 the liquid undergoing measurement. The tube 2 is lined with an insulating material such as neoprene which is continued about the faces of the flanges 8 to provide electrical insulation and at the same time to prevent corrosion. At diametrically opposite points, the tube 2 is provided with openings through which extend bosses of the lining 6, these being indicated at 10 and provided with radial openings through which stainless steel electrode pins 12 extend in fluid tight fashion with exposure of their inner ends to the liquid flowing through the tube. Metal shielding caps 16 provide arcuate channels in which are located leads 18 from the electrode pins 12 which are brought together and extend exteriorly in the form of twisted leads as indicated at 20.

It will be evident that the tube 2 may be of insulating material, such as a plastic, in which case the electrodes may be carried in simple fashion by the tube walls, and the special insulating liner is unnecessary.

A magnetic field of uniform type is provided which extends at right angles to the diameter forming the common axis of the electrode pins 12 and to the tube axis, this field being provided by a pair of coils 22 of identical shape. Each of these coils 22 comprises a coil of wire arranged as a pad to surround the opposite sides of the tube assembly, each coil being provided with a central opening indicated at 23 of approximately rectangular projected shape, with each coil provided with a semi-cylindrical open region 24 for embracing the flow tube assembly and with a transverse generally rectangular opening 26 through which laminated core elements extend. Sections of the portions of the coils extending parallel to the tube axis by planes normal to that axis are approximately rectangular as shown in FIGURE 2. A rectangular type core surrounds the coils and desirably is provided by sets of laminations of magnet iron as indicated at 28 and 30. The foregoing elements are enclosed within a shielding housing provided by steel casting halves 32 and 34, there being associated with the assembly various mounting elements which need not be described in detail but which serve to hold all of the parts in fixed assembly to prevent vibration and change of configuration of the coils. The leads from the electrode pins 12 are brought out of the housing through a connector indicated at 36.

Dimensions of the coil and core assembly are chosen to provide a uniform magnetic field. To secure this, the interior width W of the space housed by the coil desirably should not be less than 1.2L, L being the length of the flux gap bounded by iron. The interior width $W_1$ bounded by the core outside the coils is desirable not less than 1.6D, D being the diameter of the tube bore. The gap G between the coils is desirably between 0.1D and 0.3D with an optimum value of about 0.23D in large size meters wherein $W_1$ is close to 1.6D or 1.7D. In small meters wherein $W_1$ may be desirably in the range 3D to 10D the gap G may be small and merely incidental to the existence of the separate coils. The axial length A of the magnetic iron shell, the effective axial length of the flux air gap, should be approximately 2D or greater. Using the conditions just stated with the generally rectangular coils illustrated highly satisfactory uniformity of the magnetic field throughout the cross-section of the tube is secured. The magnetic field producing means just described is claimed in my application, Serial Number 768,596.

In accordance with the invention the flowmeter comprises two units which may be conveniently referred to as primary and secondary units. The primary unit encompasses the elements which are located within the boundary 48 shown in FIGURE 4, this unit including the tube 2, the electrodes 12, the coils 22 and the other physical elements already described as well as certain electrical elements referred to later. Those elements shown in FIGURE 4 which are outside the the boundary 48 constitute the secondary unit. This division of the flowmeter into two units is convenient inasmuch as the secondary unit may be standard for flowmeters of a large range of flow capacity while the primary units may be made different for the measurements of different flow ranges. All of the primary units are arranged to match the standardized secondary unit to afford interchangeability.

Figure 4:
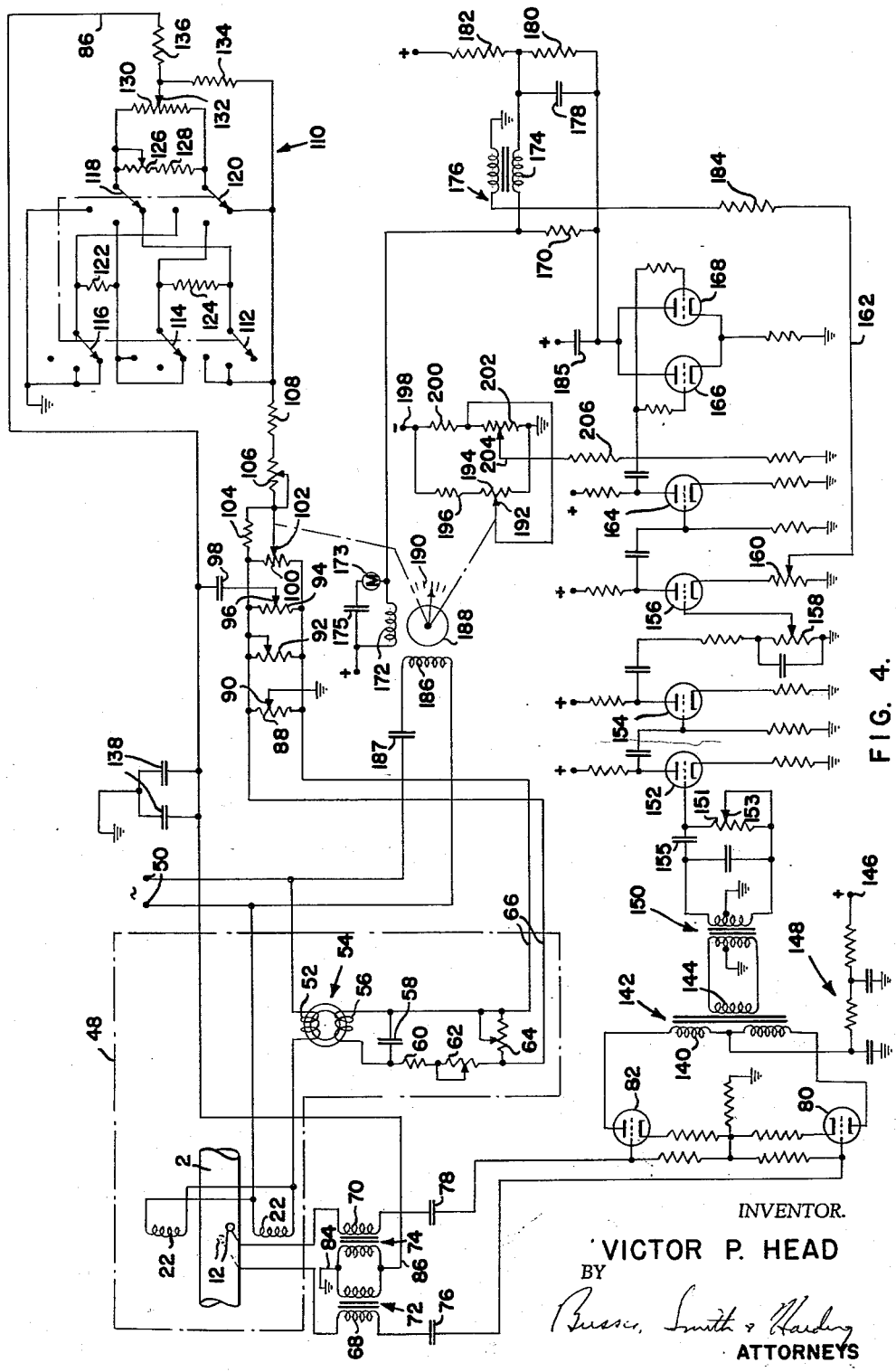
FIGURE 4 is a wiring diagram showing the electrical aspects of the flowmeter.

Consideration may now be given primarily to FIGURE 4. While not detailed, it will be understood that careful shielding is provided in accordance with good practice throughout the electrical system to avoid pickup of undesirable signal components. However even with the most effective shielding there would still occur spurious signals, and as will become more apparent hereafter the circuitry adopted is such as to produce balancing out of spurious signals so as to minimize their effects on the flow readings and make possible the accuracies already referred to.

The general circuitry involved is the invention of Sholom Kass and is claimed in his application, Serial Number 768,595.

Alternating current is supplied from the terminals 50 connetced to the usual power supply, for example, 110 volts at 60 cycles. The diagram also shows various direct current supply terminals and it will be understood that these are fed by conventional direct power supplies energized from the commercial alternating supply.

The magnetic field windings 22 are connected in parallel and to the supply terminals 50, there being in series with the field windings the primary winding 52 of a toroidal transformer 54 the secondary winding 56 of which is connected to a network comprising the capacitor 58 connected across the secondary and the parallel resistance arrangement comprising in series the fixed and adjustable resistors 60 and 62 and the adjustable resistor 64, to the terminals of the latter there being connected the leads 66 to the secondary unit. The transformer 54 and the network provide the impedance match to the secondary unit. By the use of the network described, the output of the secondary of the toroidal current transformer 54 is adjusted to be 180° out of phase (from the standpoint of its feedback action later described) with the signal potential which appears at the electrodes 12, it being noted that the primary of this current transformer is directly in series with the windings 22 and carries the current in these windings. While the elements of the network are interdependent, the adjustment of resistor 62 primarily affords phase adjustment while that of resistor 64 affords amplitude adjustment. These provide corrections for eddy current shifts. The result of the adjustments is to provide a constant ratio between the potential per unit velocity appearing at the electrodes and the current which is provided at the conductors 66. The ultimate result is that the response of the secondary unit is full scale in terms of feet per second of liquid flow velocity for any primary unit which may be associated with a secondary unit, the transformer 54 having a turn ratio consistent with the securing of this result.

The leads from the electrodes 12 are connected individually through the secondaries 68 and 70 of identical transformers 72 and 74, and through the capacitors 76 and 78 to the grids of triodes 80 and 82. The primaries of the transformers 72 and 74 are connected in parallel between ground at 84 and a line 86 in such fashion that signals fed back through the line 86 will null the signals from the electrodes, the connections being such that opposition to the electrode potential is provided by each transformer. The symmetrical arrangement here adopted involves rejection of signals which may flow in the same direction through the symmetrical connections.

The feedback signal in connection 86 is derived from a network receiving its input from the lines 66. A potentiometer 88 connected between these lines has its adjustable contact 90 grounded. A second potentiometer 92 is connected between these lines to provide a variable resistance. A third potentiometer 94 connected between these lines has its adjustable contact 96 connected through capacitor 98 to the connection 86. A fourth potentiometer 100 connected between the lines 66 is arranged as illustrated with its variable contact 102 connected to one of the lines through a resistor 104 and through a variable resistor 106 and a fixed resistor 108 to the range adjustment network generally indicated at 110. This comprises a group of ganged switches 112, 114, 116, 118 and 120 connected as illustrated between the resistor 108 and ground in conjunction with the equal resistors 122 and 124 having fixed values. The series arrangement of fixed resistor 128 and the adjustable resistor 126, and the potentiometer 130, the adjustable contact 132 of which is connected through resistor 134 to the resistor 108 and through resistor 136 to the connection 86, provides an output to the connection 86. A pair of small capacitances are connected in parallel between the connection 86 and ground. As will more fully appear, the potentiometer contact 102 is adjusted by a reversible motor 188. The functions of the various parts of the network just described are as follows:

The potentiometer 88 serves as an electrical centering control to set zero flow at any desired position on the recording chart of the meter. This makes it possible to indicate and measure bidirectional flow where that is required. The nature of this action will be evident upon considering the ground connections of contact 90 and, at 84, the ground connection of the primaries of transformers 72 and 74.

The adjustable resistance at 92 is to set the input resistance of the balancing network. This input resistance is desirably of low value, typically, for example, about 81 ohms, and by the use of the adjustment under discussion the input resistance may be set to such a value that various secondary units may be made interchangeable.

The potentiometer 94 and its connection through capacitor 98 provides a null control allowing an operator to null out unwanted signals which are in quadrature with the error signal and aids in phasing the servo amplifier precisely, with greater accuracy than is attained by using an oscilloscope. The proper phase of quadrature signal is obtained by use of the capacitor 98 the reactance of which is many times that of the total network. A phase shift obtained from this capacitor is very nearly 90° and the shift gives essentially a true quadrature signal.

Balancing is effected by the motor control movements of the contact 102 of potentiometer 100 which is associated with the fixed resistor 104 which compensates for the load on the potentiometer 100 caused by the range adjustment network, and with the adjustable resistance 106 which compensates for the loading of the range network by the input impedance of the balanced transformers 72 and 74.

The balance signal from the last mentioned elements is fed and attenuated through the range adjusting network 110 so that full scale sensitivity is accurately known. The adjustable resistor at 126 serves for trimming. The range potentiometer 130 is desirably of multiturn type and constitutes in conjunction with resistors 122 and 124 a voltage divider network. With resistors 122 and 124 equal (for example, having values of 450 ohms each) and with the parallel arrangement of the potentiometer 130 and the adjustable and fixed resistors in parallel therewith providing an effective resistance of the same value (the potentiometer 130 having, for example, a resistance of 500 ohms), the switching arrangement is such as to locate the potentiometer in any one of three alternate positions in a series arrangement including it and the resistors 122 and 124. Thus, considering an arbitrary overall range of 0 to 30, the placement of the potentiometer resistance may be in a range 0 to 10, 10 to 20 or 20 to 30, depending on the position of the switches, so that full range adjustment of the potentiometer may occur throughout any of these ranges.

The inductive reactance of the balancing transformers 72 and 74 causes a phase shift of the balancing signal which must be corrected, and this correction is obtained through the use of capacitors 138 which may be chosen to suit particular units since the necessary correction varies from unit to unit. Through the use of standard capacitors, one being relatively large and the other being small to act as a trimmer, it is unnecessary to provide for this phase correction an adjustable capacitor.

If it were assumed that there was an indicator of the potential difference between the grids of triodes 80 and 82, and if adjustment of the contact 102 of potentiometer 100 was made to provide a zero potential difference at these grids, i.e., a null, it will be evident that the setting of the potentiometer contact would be a measure of the liquid flow. Automatic adjustment to secure a null is achieved as will now be described.

The triodes 80 and 82 and their associated circuitry provide a preamplifier for the net output from the secondaries of transformers 72 and 74 and the electrodes 12. In this connection it may be noted that these transformers may be desirably located in the primary unit assembly to reduce the effect of cable capacitance as a shunt of signals originating in high resistance liquid. In such case the capacitors 138 should also be in the primary unit since they correct for the phase shift due to the inductive reactance of the transformers. A cable connection may thus either precede or follow these transformer secondaries for their connection to the remaining portions of the circuitry. The preamplifier provides primarily an impedance matching device and transformation from a balance-to-unbalance arrangement. The triodes are connected in push-pull arrangement to the primary windings 140 of a transformer 142, the secondary 144 of which feeds through a transformer 150 amplified to the first stage triode 152 of the main amplifier. Desirably, special filtering is provided at 148 for the positive supply provided to the triodes 80 and 82 from a positive supply terminal 146 of the power supply. The main amplifier involves the triodes 152, 154, 156 and 164 in generally conventional form with phase shift adjustment by variation of contact 153 of potentiometer 151, providing a variable resistance associated with capacitor 155, and with gain control provided at potentiometer 158. In order to avoid hum it is desirable to provide to the heaters of triodes 80, 82, 152 and 154 suitable direct current which may be derived from the supply through a suitable rectifier and simple filter system, not shown. Rate feedback control is provided at the potentiometer 160 in the cathode-to-ground return of triode 156.

In order to provide sufficient motor driving power, a pair of triodes 166 and 168 provide a power amplifier by arrangement in parallel. Their output is provided through resistor 170 to the field winding 172 of the motor 188. The other phase winding of this motor indicated at 186 is provided with reference current from the terminals 50 through the capacitor 187. It will be understood that the motor is of a type which reverses in accordance with the phase relationship of the currents through its windings 172 and 186, remaining stationary when the current in winding 172 is in quadrature with that properly produced therein by desired signals picked up by electrodes 12. Shunted across the field winding 172 is the series arrangement of an alternating current voltmeter 173 and a capacitor 175. The purpose of this arrangement will be more fully described hereafter.

The primary 174 of a transformer 176 is connected between the signal output side of the resistor 170 and the parallel arrangement of resistor 180 and capacitor 178, the right hand end of the transformer primary 174 being connected through resistor 182 to a positive supply terminal which may be the same terminal as that to which the winding 172 is connected. The secondary of the transformer 176 provides a signal between ground and the adjustable contact of the rate adjustment potentiometer 160, the connection being through resistor 184 and lead 162. This rate feedback control has its usual functions.

In a flowmeter of this type hydraulic "noise" may cause rapid excursions of a recording pen producing a broad line on the chart and this is undersirable. Heretofore, these excursions have been damped out by the use of dashpots, but they, in turn greatly slow down the response. In the present system provision is made electrically (by means forming the subject matter of said Kass application, Serial Number 768,762), for an action which corresponds, roughly, to the use of backlash in mechanical gearing but with provision for proper adjustment. In brief, this is accomplished by operating the final amplifier stage comprising the triodes 166 and 168 under class C conditions thereby limiting the response to large signal excursions only, in excess of those which would be due to "noise." To secure this result, variable bias is applied to the grids of these last stage triodes. A contact 192 of potentiometer 194 is driven by the motor 188 to provide automatic adjustment. The potentiometer 194 is connected in series with a resistor 196 between ground and a negative bias supply terminal 198 of the power supply. Also between this terminal 198 and ground are the resistor 200 and potentiometer 202, the adjustable contact 204 of which is connected through resistor 206 to the grids of the final stage triodes 166 and 168. The potentiometer contact 192 is joined to the junction of resistor 200 and potentiometer 202. The network just described is provided because hydraulic noise is not precisely proportional to flow rate. The resistance network comprising 194, 196 and 200 provides an output voltage across potentiometer 202 so that the smoothing control thus constituted has the desired voltage characteristic. Potentiometer 202 has a high resistance as compared with the other resistances in this smoothing network and consequently does not alter the characteristic of the output voltage but is a manually adjustable amplitude control used only to limit the bias voltage as dictated by the hydraulic noise of the system. The ganging of the contact 192 with contact 102 determines the relative amount of smoothing voltage applied as a bias to the amplifier stage.

Because of the application of the negative bias varied in accordance with desired operation, the last amplifier stage operates under class C conditions so that signal excursions less than a predetermined amplitude do not produce motor-driving output. The amount of the bias determines the minimum signals received from the triode stage 164 which will produce motor drive. The amount of this minimum may be manually adjusted through the potentiometer contact 204, while the amount is also automatically adjusted by the operation of the motor 188, the range of the "dead" region within which the drive will not be effected varying with the flow rate as reflected by the position of the motor 188. In general, the range of this dead region is desirably greater for larger flow rates than for smaller flow rates. Further, it is desirable for the width of the dead region to become essentially zero, as a result of operation of contact 192, when the flow is somewhat greater than zero, to assure a live zero, and the constants of the circuit are chosen accordingly.

While 188 has been generally referred to as a motor, it will be understood that this will generally be a conventional phase-sensitive recorder motor driving through reduction gearing the potentiometer contacts 102 and 192 and either an indicator or a marking pen cooperating with either a fixed or time driven chart scale indicated at 190. In conventional fashion this may also (or solely) operate controls related to the flow, e.g. to maintain the flow constant, to effect other operations in accordance with the flow, or the like.

The overall operation of the flowmeter may now be briefly outlined as follows:

For a given rate of flow through the tube 2 there will be produced an output voltage across the electrodes 12 the magnitude of which is proportional to the flow rate for a given magnetic field strength provided by the windings 22. Prior to balance corresponding signals are applied to the amplifier system to provide to the motor winding 172 a current which will drive the motor 188 and with it the potentiometer contact 102 to provide a feedback signal to balance the electrode signal to provide a zero input to the amplifier. In case of a voltage change at terminals 50 affecting the strength of the magnetic field, a corresponding change in output from the transformer 54 occurs so as to balance out effectively such variations. Adjustments which have already been described take care of quadrature potentials which enter into the system.

The foregoing assumes error signals of sufficient magnitude to drive the motor 188. The smoothing arrangement providing bias to the last stage of the amplifier prevents such movements when the error signals due to noise fluctuations are insufficient to provide output from the class C amplifier stage. Despite the fact that small fluctuations will not involve response of the motor, it should be noted that the class C operation referred to does not involve any deterioration of response to signals exceeding those which are to be effectively suppressed. Thus there is no loss in rapidity of response to desired signals.

The use of the meter 173 for adjustment may now be described. Potentiometer 94 serves to introduce a quadrature signal to the line 86. The introduction of a quadrature potential amplified and delivered to the motor winding 172 (as well as to the voltmeter 173) should produce no rotation of the motor, i.e., no change in flow indication, if the correct phase relation between the amplifier input and the motor field current exists. A test for proper amplifier phase adjustment may be made by manually moving the potentiometer contact 96 in both directions so that the voltmeter 173 reveals amplified quadrature signals. As a result of such signal changes there should be no change in flow indication. If such change occurs, it is necessary to adjust the phase of the amplifier output by change of the setting of contact 153 of potentiometer 151. It will be apparent that when the quadrature signal, which is always at 90° with respect to the flow signal, produces no deflection of the flow indicator, the phase relationship between the amplifier input and the servomotor field will be that for maximum sensitivity to the flow signal and for optimum rejection of any spurious quadrature signal that may arise in the flow detector. When the phase of the amplifier has been properly adjusted at 153 so that movement of potentiometer contact 96 and correspondingly large variations in readings on meter 173 are no longer accompanied by changes in flow indication, the contact 96 is then adjusted to give the minimum achievable reading on meter 173, the significance of which minimum reading would be that minimum quadrature signals were being introduced to the amplifier. Small phase drifts with time in the amplifier can then produce no significant error in flow indication in the absence of substantial quadrature signals. Conversely, if, as would be unlikely, a spurious quadrature signal appeared over a long time period, no error of flow indication would result so long as the phase situation remained satisfactory. Only in the event of the extremely unlikely simultaneous occurrence of a large spurious quadrature signal and of a considerable amplifier phase drift would there occur an error in flow indication, and a large reading on the meter 173 would make this situation immediately obvious. In further explanation of the matter just discussed the following may be pointed out:

Looking at the lines 66, they receive across them from the transformer 54 (with corrective actions between 58 and 64) an alternating signal which may be considered the in-phase signal, preliminary adjustments having been made to achive this condition as closely as possible with respect to the electrode signals. Starting, therefore, with the signal across lines 66, an alternating signal through the following network running from 88 through 108 and from 108 through 110 to line 86 is provided, delivered to the primaries of the transformers 72 and 74. Noting that only resistances are involved in this path (neglecting the high reactance at 98) the signal is an in-phase one. Across the resistance of potentiometer 94 there is, then, an in-phase potential with respect to ground represented by the contact 90 of potentiometer 88. Accordingly, an in-phase potential appears at contact 96. As previously noted, the reactance of capacitor 98 is many times that of the total resistances involved in the network. Therefore, the current through 96 is 90° out of phase, so that the signal component thus provided through capacitor 98 to the primaries of the transformers 72 and 74 is a quadrature one. The magnitude of this signal may be varied by movement of contact 96.

The foregoing explains the quadrature input to the line 86. If it were not for the slight corrections between the secondary 56 of transformer 54 and the lines 66, the quadrature potential could be applied to the line 86 directly from the supply terminals 50, utilizing a high reactance capacitor. However, it is desirable to use as the source for this quadrature signal a portion of the system which carries an in-phase signal already corrected.

It will be evident that the matter last described is quite broadly applicable to other apparatus which involves the problem of suppression of quadrature noise. A simple meter arrangement associated with means for injecting an adjustable quadrature signal is provided in accordance with the invention and eliminates the necessity for the use of an oscilloscope and the services of a trained technician for adjustment or maintenance purposes. Following adjustment, furthermore, the meter signals the possibility that through some changes in components or adjustments the apparatus may need checking. It will be understood that the invention is not to be regarded as limited except as required by the following claims.

What is claimed is:

1. Apparatus including means providing an alternating signal serving as a measure of a variable quantity, a network providing an alternating output signal bucking the first mentioned signal, an amplifier receiving the resultant of both of said signals, means controlled by the output of the amplifier and operating to adjust said network to null the signals delivered by the amplifier, manually adjustable means providing in the output of said network a signal in quadrature with the first mentioned signal, and a meter receiving the output of said amplifier to serve as a measuring means for the effect of adjustment of said means providing the quadrature signal.

2. Apparatus including means providing an alternating signal serving as a measure of a variable quantity, a network providing an alternating output signal bucking the first mentioned signal, an amplifier receiving the resultant of both of said signals, means controlled by the output of the amplifier and operating to adjust said network to null the signals delivered by the amplifier, manually adjustable means providing to the amplifier a signal in quadrature with the first mentioned signal, and a meter receiving the output of said amplifier to serve as a measuring means for the effect of adjustment of said means providing the quadrature signal.

3. A flowmeter comprising a conduit for flowing liquid, electromagnetic means providing a magnetic field transverse to said conduit, means supplying alternating current to said electromagnetic means, electrodes exposed to liquid flowing through said conduit and located on a line extending transversely through said field to pick up signals generated by flow of liquid through said field, an amplifier having its input receiving signals from said electrodes, a transformer having its primary connected to carry the alternating current supplied to said electromagnetic means, a network receiving an input from the secondary of the last mentioned transformer and providing an output to said amplifier bucking the signals from said electrodes, means controlled by said amplifier to effect adjustment of said network to null the signals delivered from the amplifier, manually adjustable means providing in the output of said network a signal in quadrature with the signals produced by said electrodes, and a meter receiving the output of said amplifier to serve as a measuring means for the effect of adjustment of said means providing the quadrature signal.

4. A flowmeter comprising a conduit for flowing liquid, electromagnetic means providing a magnetic field transverse to said conduit, means supplying alternating current to said electromagnetic means, electrodes exposed to liquid flowing through said conduit and located on a line extending transversely through said field to pick up signals generated by flow of liquid through said field, an amplifier having its input receiving signals from said electrodes, a transformer having its primary connected to carry the alternating current supplied to said electromagnetic means, a network receiving an input from the secondary of the last mentioned transformer and providing an output to said amplifier bucking the signals from said electrodes, means controlled by said amplifier to effect adjustment of said network to null the signals delivered from the amplifier, manually adjustable means providing to the amplifier a signal in quadrature with the signals produced by said electrodes, and a meter receiving the output of said amplifier to serve as a measuring means for the effect of adjustment of said means providing the quadrature signal.

References Cited in the file of this patent

UNITED STATES PATENTS

| | | | |
|---|---|---|---|
| 2,406,221 | Hornfeck | Aug. 20, | 1946 |
| 2,657,348 | Jarvis | Oct. 27, | 1953 |
| 2,671,875 | Urbanik | Mar. 9, | 1954 |
| 2,685,796 | Romanowski et al. | Aug. 10, | 1954 |
| 2,691,303 | De Boisblanc | Oct. 12, | 1954 |
| 2,696,737 | Mittelmann | Dec. 14, | 1954 |
| 2,729,772 | Perkins | Jan. 3, | 1956 |
| 2,757,538 | Soffel | Aug. 7, | 1956 |
| 2,844,568 | Mertz | July 22, | 1958 |